United States Patent [19]

Willis

[11] Patent Number: 4,645,990
[45] Date of Patent: Feb. 24, 1987

[54] HIGH VOLTAGE CONTROL CIRCUIT FOR VIDEO DISPLAY APPARATUS

[75] Inventor: Donald H. Willis, Indianapolis, Ind.

[73] Assignee: RCA Corporation, Princeton, N.J.

[21] Appl. No.: 760,458

[22] Filed: Jul. 30, 1985

[51] Int. Cl.$^4$ ............................................. H01J 29/70
[52] U.S. Cl. ................................... 315/411; 315/408; 358/190
[58] Field of Search ................ 315/411, 408; 358/190

[56] References Cited

U.S. PATENT DOCUMENTS 4,227,125 10/1980 Bohringer .
4,516,169 5/1985 Truskalo ............................ 358/190
4,524,411 6/1985 Willis .

FOREIGN PATENT DOCUMENTS 2141883A 1/1985 United Kingdom .

OTHER PUBLICATIONS

U.S. patent application Ser. No. 497,953, filed May 25, 1983, entitled Multiple Scan Rate Deflection Circuit Incorporating Scan Compensation, in the name of W. E. Babcock.
U.S. patent application Ser. No. 676,947, filed Nov. 30, 1984, entitled Raster Width Regulator Circuit, in the name of W. F. W. Dietz.

Primary Examiner—Theodore M. Blum
Attorney, Agent, or Firm—Eugene M. Whitacre; Joseph J. Laks; Sammy S. Henig

[57] ABSTRACT

A horizontal deflection circuit output stage is coupled to a first end terminal of a primary winding of a flyback transformer for developing at that terminal a retrace voltage. A second end terminal of the primary winding is coupled to a switched mode power supply that provides at the second end terminal a combined voltage that is the sum of a DC B+ scanning voltage component and a horizontal rate rectangular-wave voltage component. The difference voltage between the retrace voltage and the rectangular-wave voltage component is developed between the end terminals of the primary winding of the flyback transformer and is coupled by transformer action to a high voltage secondary winding for generating an ultor accelerating potential. The phase of the rectangular-wave voltage component relative to the retrace voltage determines the level of the ultor accelerating potential. The duty cycle of the rectangular-wave voltage component determines the DC B+ scanning voltage that controls the amplitude of the deflection current.

17 Claims, 3 Drawing Figures

HIGH VOLTAGE CONTROL CIRCUIT FOR VIDEO DISPLAY APPARATUS

This invention relates to a power supply for a television deflection circuit.

In television receiver or monitor circuits, the ultor accelerating potential, or high voltage, for a picture tube is derived by rectifying a retrace pulse voltage developed in a high voltage winding of a horizontal output or flyback transformer. The retrace pulse voltage is developed by a horizontal deflection circuit output stage and then applied to the primary winding of the flyback transformer. The horizontal deflection circuit output stage comprises a horizontal deflection winding, retrace capacitor and trace switch comprising a damper diode and a horizontal output transistor.

In typical television receiver circuits, raster size is inversely proportional to the square root of the ultor accelerating potential and, with respect to raster width, is directly proportional to a direct current B+ scanning voltage that is coupled to the flyback transformer primary winding.

In some prior art circuits, the ultor accelerating potential is controlled by the same DC B+ scanning voltage that controls the deflection current amplitude in the deflection winding. Because the high voltage circuit exhibits a certain amount of source impedance, increasing the load current drawn from the ultor terminal will result in a decreased ultor accelerating potential even though the B+ scanning voltage is maintained constant, for example, by a regulator circuit of the power supply. Disadvantageously, raster width tends to change with ultor loading variations, the raster width tending to increase with increased ultor loading.

In accordance with an aspect of the invention, first and second voltages are coupled to a deflection circuit output stage. The deflection circuit output stage produces a deflection current in a deflection winding and a deflection rate output voltage. A high voltage is produced from both the second voltage and the output voltage. The first voltage is used for controlling the deflection current. The second voltage is used for controlling the level of the high voltage for a given amplitude of the deflection current. Thus, advantageously, the high voltage, or ultor accelerating potential, for example, and the deflection current may be separately controlled by the first and second voltages.

In carrying out an aspect of the invention, the first and second voltages are combined at a terminal to form an energizing voltage that energizes the deflection circuit output stage. Thus, the first and second voltages form first and second voltage components, respectively, of the energizing voltage.

The ability to adjust separately the ultor voltage and the deflection current is particularly useful in display monitors that are required to operate selectively in any one of several horizontal frequencies. When the horizontal frequency is, for example, increased in such display monitors, it may be desirable to maintain the same amplitude of the deflection current. Maintaining the amplitude of the deflection current is accomplished by a corresponding increase in the level of the DC B+ scanning voltage. The change in the duty cycle of the waveform at the corresponding terminal of the flyback transformer primary winding, that occurs because of such increase in frequency may cause an undesired change in the ultor accelerating potential and raster width.

In accordance with another aspect of the invention, adjusting separately the ultor accelerating potential and the regulated deflection current amplitude is done by separately controlling the respective voltage components of the energizing voltage at the first terminal of the flyback transformer. In this way, it is possible to achieve, in an economical manner, a constant raster width for a range of horizontal scan frequencies.

In accordance with yet another aspect of the invention, the second voltage component that is an alternating current (AC) voltage, having a frequency that is in accordance with the deflection frequency, is combined with the first voltage component that is, illustratively, a DC B+ scanning voltage component, to produce the energizing voltage that is coupled to a first terminal of the flyback transformer primary winding. The output, or retrace voltage of the deflection circuit output stage is coupled to a second terminal of the primary winding. The DC B+ scanning voltage component of the energizing voltage substantially controls the deflection current in the deflection winding. The phase of the AC, or second, voltage component relative to the deflection frequency output voltage in the second terminal of the primary winding determines the peak value of a voltage at a terminal of a secondary winding of the flyback transformer that is used for controlling the high voltage such as the ultor accelerating potential or a focus potential. The frequency of the AC, or second, voltage component of the energizing voltage equals, illustratively, the horizontal frequency $f_H$, or its harmonic.

In carrying out another aspect of the invention, the AC, or second, voltage component is obtained, from a chopper transformer of a switched mode power supply (SMPS) where it is also summed up with the DC B+ scanning voltage, that provides the first voltage component, to produce the energizing voltage. The energizing voltage is coupled to the output stage via the flyback transformer primary winding.

Conventionally built SMPS, which derive the B+ scanning voltage from a source of an unregulated DC supply voltage, maintain B+ scanning voltage constant by controlling the conduction time of a regulator switch. A SMPS may include a pulse width modulator (PWM) that receives a periodic input signal having a constant duty cycle. Typically, the PWM generates, from the constant duty cycle periodic input signal, a signal, having the same frequency as that of the periodic input signal but having a variable duty cycle, for controlling, in accordance with the variable duty cycle, the amplitude of the B+ scanning voltage. The variable duty cycle signal is coupled to the chopper regulator switch for generating pulsed output current in a primary winding of a chopper transformer.

The voltage developed across a secondary winding of the chopper transformer is rectified to produce the B+ scanning voltage. A voltage representative of the B+ scanning voltage is fed back to a comparator that compares it to a reference voltage. The comparator output signal controls the duty cycle of the variable duty cycle signal so as to maintain the B+ scanning voltage constant.

In an embodiment of the invention, the variable duty cycle signal is also coupled to the secondary winding of the chopper transformer to provide the AC, or second, voltage component of the energizing voltage. The duty cycle of the variable duty cycle determines the B+ scanning voltage that controls the deflection current. The phase of the variable duty cycle signal relative to the deflection stage output, or retrace, signal determines the peak level of the voltage at the terminal of the secondary winding of the flyback transformer that is used for controlling the high voltage.

In accordance with a further aspect of the invention, the AC voltage component of the energizing voltage controls the high voltage amplitude across the high voltage winding of the flyback transformer for producing, illustratively, regulated constant ultor accelerating potential; whereas the DC B+ scanning voltage component controls the deflection current in the deflection winding for producing constant amplitude deflection current.

In accordance with a yet further aspect of the invention, the deflection current and the ultor accelerating potential are controlled by first and second regulator feed-back-loops, respectively. The first regulator feed-back-loop controls the required amplitude of the deflection current by controlling the B+ scanning voltage component of the energizing voltage. The second regulator feed-back-loop controls the required level of the ultor accelerating potential by controlling the phase of the AC or second voltage component of the energizing voltage relative to that of the retrace voltage at the first terminal of the flyback tranformer primary winding.

In accordance with an additional aspect of the invention, the first regulator feed-back-loop includes a PWM that may obtain periodic signal from a tertiary winding of the flyback transformer. The first regulator feed-back-loop conrols the B+ scanning voltage component to maintain it constant. The second regulator feed-back-loop includes the same PWM of the first regulator feed-back loop. The phase of the variable duty cycle signal generated by the PWM, relative to, for example, the horizontal rate periodic signal from the tertiary winding, is controlled, in the second regulator feed-back-loop, to obtain the desired level of the ultor accelerating potential. Thus, the second regulator feed-back-loop provides, illustratively, an ultor accelerating potential that remains constant even when the load current, supplied by the ultor accelerating potential, changes.

Figure 1:
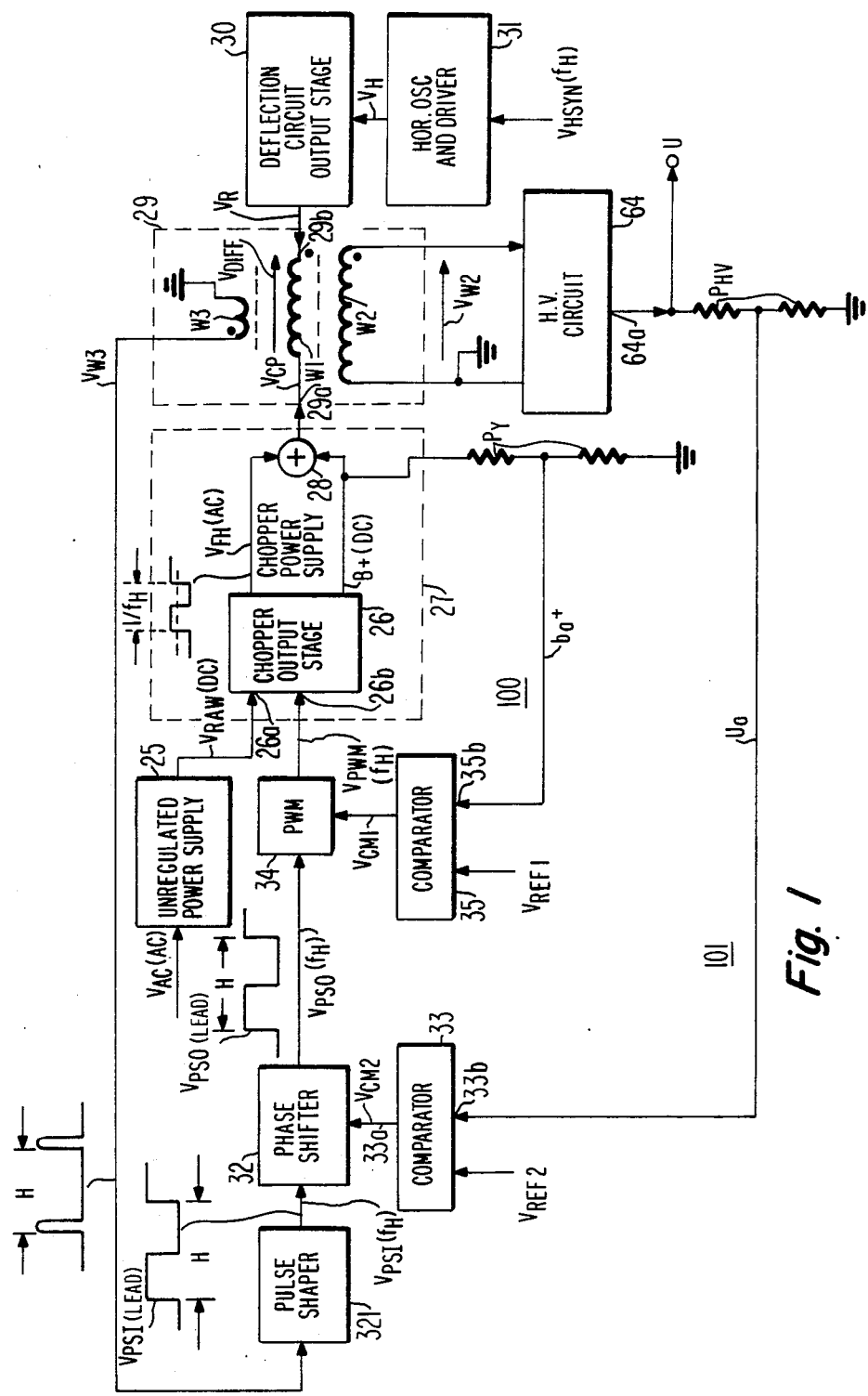
FIG. 1 illustrates a block diagram of a power supply arrangement, embodying an aspect of the invention, having a chopper output stage that provides energizing voltage to a deflection circuit output stage.

Referring to FIG. 1, a source of AC power line voltage $V_{AC}$ is coupled to a power supply 25 that produces an unregulated DC voltage $V_{RAW}$. Power supply 25 may include a full wave bridge rectifier having DC voltage $V_{RAW}$ developed across a filter capacitor. Neither the bridge rectifier nor the filter capacitor is shown in FIG. 1. Filtered but unregulated DC voltage $V_{RAW}$ is coupled to a terminal 26a of a chopper output stage 26, that is included in a chopper power supply 27.

In accordance with an aspect of the invention, chopper output stage 26 produces, an AC, horizontal rate square waveform voltage $V_{FH}$ and a regulated DC B+ scanning voltage that are summed in an adder stage 28 to produce a combined scanning, or energizing, voltage $V_{CP}$. Thus, voltage $V_{CP}$ includes AC and DC voltage components, provided by voltage $V_{FH}$ and B+ scanning voltage, respectively.

Combined scanning voltage $V_{CP}$ is coupled to an end terminal 29a of a primary winding W1 of a flyback transformer 29. The other end terminal of primary winding W1, terminal 29b, is coupled to a deflection circuit output stage 30 that generates at termianl 29b a retrace voltage $V_R$ and a deflection current in a deflection winding, not shown in FIG. 1.

A conventional horizontal oscillator and driver 31 produces an output signal $V_H$ that is coupled to deflection circuit output stage 30 for controlling the switching of output stage 30. Driver 31 is controlled by a horizontal rate synchronizing signal $V_{HSYN}$ that is obtained from, illustratively, a sync separator of a television receiver, not shown in FIG. 1.

An ultor voltage U is obtained at a terminal 64a of a high voltage circuit 64. High voltage circuit 64 produces ultor voltage U from a high voltage $V_{W2}$ across a tertiary winding W2 of the flyback transformer.

A horizontal rate signal $V_{W3}$ is coupled from a secondary winding W3 of flyback transformer 29 to a conventionally built pulse shaper 321 that generates from signal $V_{W3}$ a horizontal rate signal $V_{PSI}$ having, for example, a square waveform with a 50% duty cycle. Signal $V_{PSI}$ is coupled to a phase shifter 32 that produces a signal $V_{PSO}$ that is phase shifted, in accordance with a control signal $V_{CM2}$, relative to signal $V_{PSI}$. Phase shifting is accomplished by varying, for example, the timing of each leading edge $V_{PSO(LEAD)}$ of signals $V_{PSO}$ relative to the corresponding leading edge $V_{PSI(LEAD)}$ of signal $V_{PSI}$ illustrated in FIG. 1. Control signal $V_{CM2}$ is developed at an output terminal 33a of a voltage comparator 33 of a high voltage regulator loop 101 that regulates ultor voltage U.

A voltage $u_a$, that is representative of voltage U, is coupled from a resistive voltage divider $P_{HV}$ to an input terminal 33b of comparator 33. Comparator 33 produces, from the difference between voltage $u_a$ and a constant reference voltage $V_{REF2}$, control signal $V_{CM2}$ that is representative of such difference and that is used for controlling the phase of signal $V_{PSO}$ relative to that of signal $V_{PSI}$.

Horizontal rate signal $V_{PSO}$ of phase shifter 32 is coupled to a pulse width modulator, PWM 34, that produces an output signal $V_{PWM}$ having, for example, the same phase and frequency of signal $V_{PSO}$ but having a duty cycle that is controlled by a control signal $V_{CM1}$. Signal $V_{CM1}$ is developed at an output terminal of a voltage comparator 35 of a regulator loop 100 that regulates the level of DC B+ scanning voltage. The level of DC B+ scanning voltage determines the deflection current amplitude. The phase of signal $V_{PSO}$ controls the phase of signal $V_{FH}$ of chopper output stage 26.

A voltage $b_a+$ that is representative of B+ scanning voltage is coupled from a resistive voltage divider $P_Y$ to an input terminal 35b of comparator 35. Comparator 35 produces, from the difference between voltage $b_a+$ and a constant reference voltage $V_{REF1}$, control signal $V_{CM1}$ that is representative of such difference voltage.

The duty cycle of output signal $V_{PWM}$ is controlled in accordance with control signal $V_{CM1}$ of comparator 35. B+ scanning voltage is controlled by varying the duty cycle of signal $V_{PWM}$. Deflection current regulator 100 that includes comparator 35, PWM 34 and chopper output stage 26 regulates the B+ scanning voltage to be, illustratively, constant, so as to maintain the amplitude of the deflection current constant in a deflection winding, not shown in FIG. 1, of deflection circuit output stage 30, as described later on. Thus, the operation of deflection current regulator 100 is similar to the operation of a conventional SMPS that utilizes a PWM.

Figure 2:
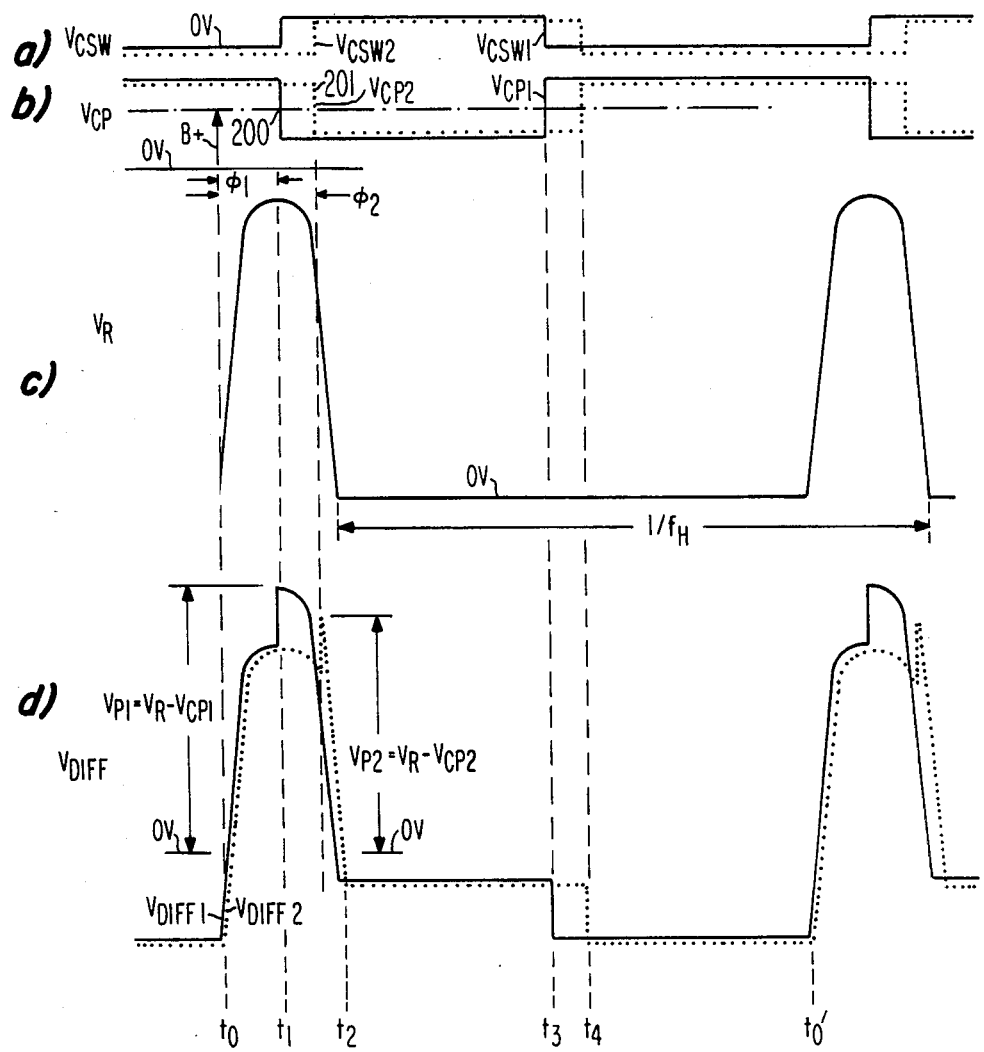
FIGS. 2a–2d illustrate waveforms useful in explaining the arrangement of FIG. 1.

FIGS. 2b–2d illustrate waveforms useful for explaining the operation of high voltage regulator 101 of FIG. 1. Similar numbers and symbols in FIGS. 1 and 2b–2d indicate similar items or functions. FIG. 2b illustrates the waveform of combined voltage $V_{CP}$ of chopper power supply 27 of FIG. 1 that is coupled to terminal 29a. Voltage $V_{CP}$ has a DC voltage component that is equal to B+ scanning voltage, as illustrated schematically in FIG. 2b. Voltage $V_{CP}$ has an AC voltage component that is equal to signal $V_{FH}$. Voltage $V_{CP}$ is shown for two hypothetical examples.

In the first hypothetical example, illustrated by solid lines in FIGS. 2b–2d, voltage $V_{CP1}$ has a falling edge 200 that occurs at time $t_1$ at, for example, the center of retrace. In the second hypothetical example, illustrated by dotted lines, voltage $V_{CP2}$ has a falling edge 201 that occurs at time $t_2$ that is slightly later than time $t_1$. The waveform of retrace voltage $V_R$ that is coupled to terminal 29b of FIG. 1 is illustrated in FIG. 2c.

A given level of B+ scanning voltage produced by deflection current regulator 100 of FIG. 1 produces a corresponding peak amplitude of voltage $V_R$ that is, as described later on, substantially independent of the AC voltage component of voltage $V_{CP}$.

The peak positive voltage of voltage $V_{W2}$ across tertiary winding W2 of transformer 29 determines the level of ultor accelerating potential U. Voltage $V_{W2}$ is generated, by a transformer action, from the difference voltage $V_{DIFF}$ between voltages $V_R$ and voltage $V_{CP}$ that are coupled to the respective terminals of primary winding W1 of flyback transformer 29. Thus, in the first hypothetical example, voltage $V_{W2}$ is directly related to difference voltage $V_{DIFF1} = V_R - V_{CP1}$; whereas in the second hypothetical example, voltage $V_{W2}$ is directly related to difference voltage $V_{DIFF2} = V_R - V_{CP2}$.

FIG. 2d illustrates the waveforms of difference voltages $V_{DIFF1}$ and $V_{DIFF2}$ for the first and second hypothetical examples, respectively. Illustratively, for a phase shift $\phi 1$, between falling edge 200 of voltage $V_{CP1}$ of the first hypothetical example of FIG. 2b and the leading edge of retrace voltage $V_R$ of FIG. 2c, the positive peak of voltage $V_{DIFF}$ of FIG. 2d is equal to $V_{P1}$; whereas for a phase shift $\phi 2$, between falling edge 201 of voltage $V_{CP2}$ of the second hypothetical example of FIG. 2b and the leading edge of retrace voltage $V_R$ of FIG. 2c, the positive peak of voltage $V_{DIFF}$ is equal to $V_{P2}$ of FIG. 2d that is smaller than $V_{P1}$. Thus, in accordance with an aspect of the invention, ultor voltage U of FIG. 1 may be varied by varying the phase shift $\phi$ of the AC component of voltage $V_{CP}$ of FIG. 2b relative to that of retrace voltage $V_R$ of FIG. 2c. Note that varying the phase shift $\phi$ does not affect the average or DC component of voltage $V_{CP}$ of FIG. 2b that remains equal to B+ scanning voltage.

In operation, high voltage regulator 101 of FIG. 1 varies the phase of signal $V_{PSO}$ in phase shifter 32, that is conventionally built, in accordance with voltage comparator 33 signal $V_{CM2}$. As explained before, voltage comparator 33 generates signal $V_{CM2}$ that is representative of the difference between voltages $u_a$ and $V_{REF2}$. Thus, when ultor voltage U of FIG. 1 tends to, illustratively, increase, as a result of, for example, a decrease in the electron beam current provided by high voltage circuit 64 the phase shift $\phi$ of FIG. 2b, between the falling edge of the AC voltage component of voltage $V_{CP}$ and retrace voltage $V_R$ of FIG. 2c, becomes larger, causing the next falling edge of voltage $V_{CP}$ to occur closer to the end of retrace time $t_2$ of FIG. 2c. Consequently, positive peak voltage $V_P$ of voltage $V_{DIFF}$ of FIG. 1 tends to decrease, thus counteracting the assumed tendency of ultor voltage U to increase, and thereby, tending to maintain ultor voltage U constant. Because regulator 101 controls only the phase of the AC voltage component but not the DC voltage component of voltage $V_{CP}$, regulating ultor voltage U is accomplished with regulator 101 without changing B+ scanning voltage.

Figure 3:
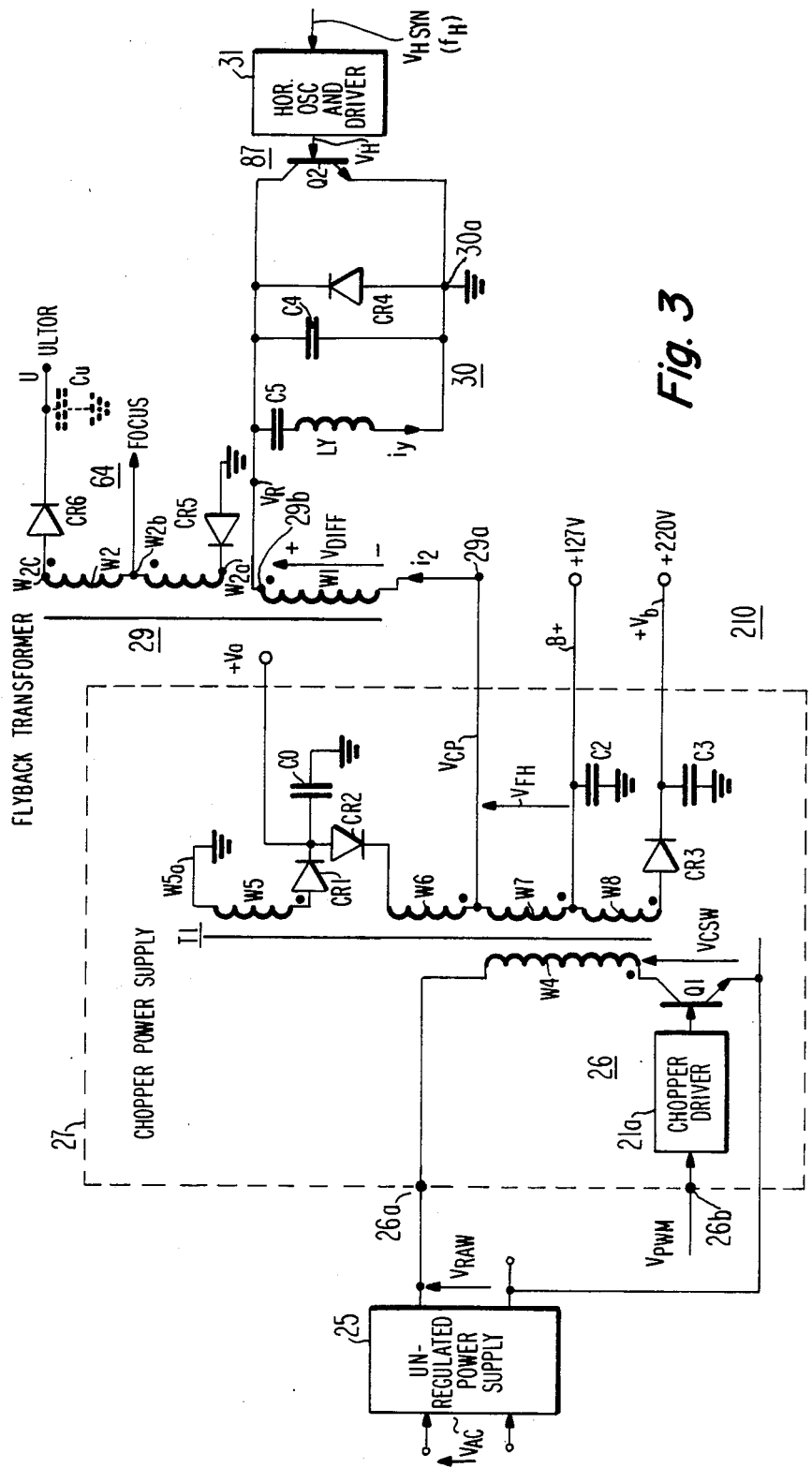
FIG. 3 illustrates a more detailed diagram of the chopper output stage, the flyback transformer and the deflector circuit output stage of FIG. 1.

FIG. 3 illustrates an arrangement 210 that is a more detailed embodiment of chopper power supply 27, flyback transformer 29, high voltage circuit 64 and deflection circuit output stage 30 of FIG. 1. Similar numbers and figures in FIGS. 1, 2a–2d and 3 illustrate similar items or functions.

Chopper power supply 27 of FIG. 3 includes a chopper driver 21a that controls the base electrode voltage of a transistor switch Q1 of chopper output stage 26, in accordance with output signal $V_{PWM}$ of PWM 34 of FIG. 1. A primary winding W4 of a chopper transformer T1 of FIG. 3 is coupled between terminal 26a of chopper output stage 26 and the collector electrode of transistor switch Q1. DC voltage $V_{RAW}$ of unregulated power supply 25 is coupled between terminal 26a and the emitter electrode of transistor switch Q1.

In operation, output signal $V_{PWM}$ produces a corresponding rectangular waveform voltage $V_{CSW}$ between the collector and the emitter electrodes of transistor switch Q1 as illustrated in FIG. 2a. Voltages $V_{CSW1}$ and $V_{CSW2}$ in FIG. 2a are the corresponding waveforms of voltage $V_{CSW}$ for the first and second hypothetical examples, respectively, that were discussed before.

A terminal W5a of a transformer T1 winding W5 of FIG. 3 is coupled to ground, the common conductor. The other end terminal of winding W5 is coupled to the anode electrode of a rectifier CR1. The cathode electrode of rectifier CR1 is coupled to the anode electrode of a rectifier CR2. The cathode electrode of rectifier CR2 is coupled through a series arrangement of windings W6, W7 and W8 to the anode electrode of a rectifier CR3. The cathode electrode of rectifier CR3 is coupled to a filter capacitor C3 for developing a DC voltage $+V_b$ that is used to energize load circuits not illustrated in FIGS. 1 and 3. A filter capacitor C2 of FIG. 3 is coupled between the junction of windings W7 and W8 and ground for developing DC B+ scanning voltage. A filter capacitor C0 is coupled between ground and the junction of the cathode and anode electrodes of rectifiers CR1 and CR2, respectively, for developing a DC voltage $+V_a$ that is used to energize other loads, also not illustrated in FIGS. 1 and 3.

As a result of chopper, or switching, operation of transistor switch Q1 of FIG. 3, DC voltage $+V_a$, B+ scanning voltage and voltage $+V_b$ are developed across capacitors C0, C2 and C3, respectively.

The length of the interval in which transistor switch Q1 is conductive determines the magnetic energy stored in transformer T1. When transistor switch Q1 becomes nonconductive, and as a result of flyback action, the positive portion of voltage $V_{CSW}$ is developed. The amplitude of voltage $V_{CSW}$ is directly related to the stored magnetic energy, and, therefore, to the duty cycle of output signal $V_{PWM}$ that controls the turn-on interval of transistor switch Q1. Voltage $V_{CSW}$ determines the level of B+ scanning voltage that is obtained from series coupled secondary windings W5, W6 and W7.

Because the DC voltage drop across windings W6, W7 and W8 is small, voltage $V_{CP}$ at the junction between windings W6 and W7 contains a DC voltage component that is equal to B+ scanning voltage across capacitor C2. The switching operation of transistor switch Q1 causes the square wave voltage across primary winding W4 to be coupled by transformer action of chopper transformer T1 across winding W7. This voltage across winding W7 is additively combined to B+ scanning voltage to produce the waveform of voltage $V_{CP}$ of FIG. 2b.

Voltage $V_{CP}$ of FIG. 3 is coupled to end terminal 29a of primary winding W1 of flyback transformer 29. The other end terminal of winding W1, terminal 29b, is coupled to the collector electrode of a transistor switch Q2 of deflection circuit output stage 30. In deflection circuit output stage 30, one end terminal of a horizontal deflection winding LY is coupled to terminal 29b through a trace capacitor C5. Deflection winding LY provides horizontal deflection in a cathode ray tube that is not shown in the figures. One plate of a retrace capacitor C4 is coupled to terminal 29b. Both the other plate of capactor C4 and the other end terminal of deflection winding LY are coupled to a terminal 30a that is at ground potential. A trace switch 87 includes horizontal output transistor switch Q2 coupled in parallel with a damper diode CR4. Trace switch 87 is coupled in parallel with retrace capacitor C4. A conventional synchronized horizontal oscillator and driver circuit 31 provides switching control signals to the base electrode of horizontal output transistor switch Q2 to turn on the transistor during the second half of the horizontal trace interval and to turn off the transistor near the end of the trace interval, for initiating the horizontal retrace interval. Damper diode CR4 conducts during the first half of the trace interval. The operation of trace switch 87 generates scanning curent $i_y$ in deflection winding LY in each horizontal deflection cycle.

In high voltage generating circuit 64, the anode electrode of a rectifier CR5 is coupled to ground. The cathode electrode of rectifier CR5 is coupled to an end terminal $W_{2a}$ of high voltage winding W2. The other end terminal of winding W2, terminal $W_{2c}$, is coupled to the anode electrode of a rectifier CR6 causing ultor voltage U to develop at the cathode electrode of rectifier CR6. The cathode electrode of rectifier CR6 and an intermediate terminal $W_{2b}$ of winding W2 are coupled to the ultor and focus electrodes, respectively, of the cathode ray tube that is not shown in the figures.

In operation, deflection switch 87 is conductive, or closed, during the trace interval. When deflection switch 87 is closed, it isolates flyback transformer 29 from deflection winding LY. An upramping primary current $i_2$ in primary winding W1 increases the energy stored in flyback transformer 29 during the trace interval. This stored energy replenishes losses in deflection circuit output stage 30 during the retrace interval, when switch 87 is opened. Winding W1 of transformer 29, retrace capacitor C4 and deflection winding LY form a retrace resonant circuit during retrace when switch 87 is nonconductive. The energy stored in transformer 29 and deflection winding LY, at the end of the trace interval, is transferred during the first half of the retrace interval into retrace capacitor C4 to produce retrace voltage $V_R$ across retrace capacitor C4. Retrace voltage $V_R$ is applied to terminal 29b of primary winding W1 of flyback transformer 29.

The difference voltage $V_{DIFF}$ of FIG. 2d between retrace voltage $V_R$, having the waveform that is illustrated in FIG. 2c, and voltage $V_{CP}$, of FIG. 2b, is coupled by transformer action from winding W1 to winding W2 of FIG. 3 for developing ultor voltage U, as described in detail before.

Regulator 100 of FIG. 1 maintains deflection current $i_y$, illustratively, constant. Simultaneously, regulator 101 maintains ultor voltage U, illustratively, constant, even when the ultor current changes. Therefore, the feedback arrangements of regulators 100 and 101, respectively, tend to maintain the raster width, illustratively, constant.

What is claimed:

1. A high voltage power supply comprising:
   a source of an input signal at a deflection rate;
   a deflection winding;
   a deflection circuit output stage responsive to said input signal for producing a deflection current in said deflection winding and a deflection rate output voltage;
   means for producing first and second voltages that are coupled to said output stage such that said first voltage controls the amplitude of said deflection current; and
   means responsive to said output voltage of said output stage and to said second voltage for producing said high voltage therefrom, wherein a given variation in said second voltage is capable of varying said high voltage without substantially affecting the amplitude of said deflection current.

2. A high voltage power supply according to claim 1 wherein said high voltage producing means comprises a flyback transformer having first, second and third terminals, wherein said output voltage and second voltage are coupled to said first and second terminals of said transformer for producing at said third terminal a voltage representative of the difference voltage between said first and second terminals and means responsive to said voltage at said third terminal for producing said high voltage therefrom.

3. A power supply according to claim 2 wherein said first and second voltages are additively combined at said second terminal of said flyback transformer.

4. A power supply according to claim 1 wherein said first voltage comprises a DC voltage.

5. A power supply according to claim 1 wherein said second voltage comprises an AC voltage at a frequency that is related to the deflection frequency.

6. A power supply according to claim 1 wherein said first and second voltage producing means comprises means for generating a deflection synchronized, periodic, variable duty cycle waveform, and means for varying the phase of said variable duty cycle waveform to produce said second voltage therefrom.

7. A power supply according to claim 6 wherein said variable duty cycle waveform generating means comprises a switched mode power supply.

8. A power supply according to claim 7 wherein the phase of said variable duty cycle waveform controls said high voltage.

9. A power supply according to claim 8 wherein the duty cycle of said variable duty cycle waveforms controls said deflection current.

10. A power supply according to claim 1 wherein each of said first and second voltages is produced in first and second feed-back-loop circuits, respectively, that control said deflection current and said high voltage, respectively.

11. A power supply according to claim 1 further comprising, a pulse width modulator that is responsive to a voltage representative of said output voltage of said output stage for generating a signal having variable duty cycle that controls said first voltage and means for controlling the phase of the pulses of said variable duty cycle signal in accordance with the magnitude of said high voltage to produce said second voltage.

12. A power supply according to claim 1 wherein said first and second voltage producing means comprises means for generating a deflection synchronized, periodic rectangular-wave voltage and means for varying the phase of said rectangular-wave voltage.

13. A power supply according to claim 1 wherein a variation of said second voltage causes a corresponding variation of said high voltage without affecting the amplitude of said deflection current.

14. A power supply according to claim 1 wherein said first and second voltages producing means includes a first control circuit responsive to a first control signal for varying said first voltage in accordance therewith and a second control circuit responsive to a second control signal for varying said second voltage in accordance therewith to cause a corresponding variation of said high voltage without affecting the amplitude of said deflection current.

15. A high voltage power supply comprising:
a source of an input signal at a deflection rate;
a deflection circuit output stage responsive to said input signal for producing a deflection current in a deflection winding and a deflection rate output voltage;
means for producing first and second voltages that are coupled to said output stage;
a high voltage circuit coupled to said output stage for generating said high voltage from a retrace voltage in said deflection winding;
a first feed-back-loop circuit for controling said first voltage to establish a predetermined amplitude of said deflection current; and
a second feed-back-loop circuit for controlling said second voltage to establish a level of said high voltage that is controlled, in said second feed-back-loop circuit, without affecting said predetermined amplitude of said deflection current that is controlled in said first feed-back-loop circuit.

16. A high voltage power supply according to claim 15 wherein said high voltage circuit is responsive to said second voltage to generate therefrom said high voltage.

17. A high voltage power supply according to claim 15 wherein said deflection circuit derives energy therefor from said first voltage and said high voltage circuit derives energy therefor from said second voltage.

* * * * *